July 22, 1924.
D. S. LAMBERT ET AL
WHEEL PULLER
Filed Feb. 23, 1922
1,502,103
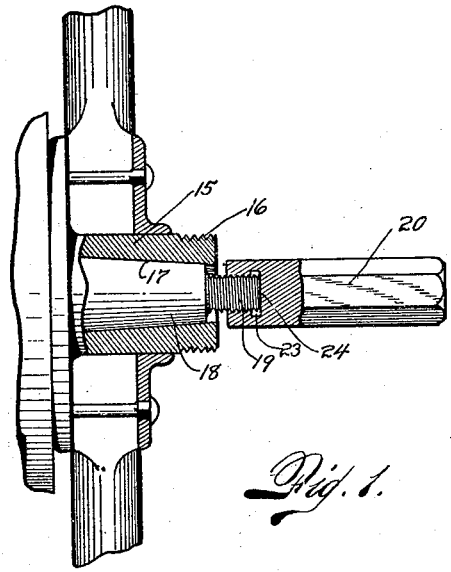
Fig. 1.
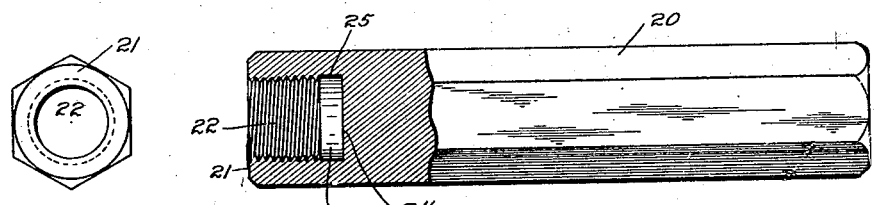
Fig. 3.  Fig. 2.
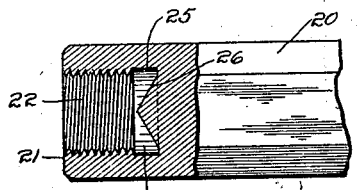 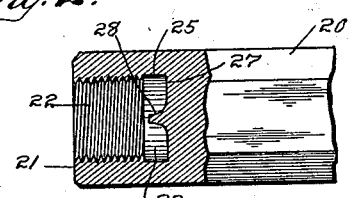
Fig. 4.  Fig. 5.
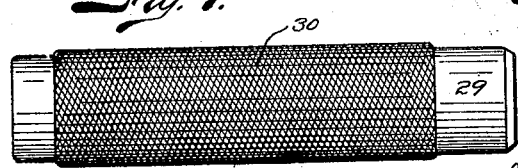
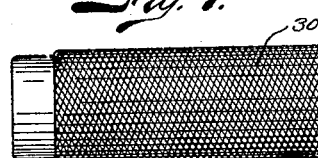
Fig. 6.
WITNESS.
John B. Dade
INVENTORS
Daniel S. Lambert
Cranston B. Rader.
By Wilkinson & Ginsta
Their ATTORNEYS.

Patented July 22, 1924.

1,502,103

UNITED STATES PATENT OFFICE.

DANIEL S. LAMBERT AND CRANSTON B. RADER, OF DENVER, COLORADO.

WHEEL PULLER.

Application filed February 23, 1922. Serial No. 538,633.

*To all whom it may concern:*

Be it known that we, DANIEL S. LAMBERT and CRANSTON B. RADER, both citizens of the United States, residing at the city and county of Denver and State of Colorado, have invented certain new and useful Improvements in Wheel Pullers, of which the following is a specification.

This invention embodies improvements in that class of tools, commercially designated as wheel pullers, which function to assist in the removal of a wheel from its axle arm, where the bore of the wheel hub is tapered to fit a tapered axle arm to which it is longitudinally keyed.

It is understood that, where a wheel is so mounted as to rotate with its axle and this is especially true in the case of automobile wheels, it is more or less of a task to remove the wheel where requisite, so that mechanical means are generally used to assist in the removal of the wheel.

The primary object of this invention, therefore, has been to devise improved means, to assist in the removal of a wheel, embodying a simple and durable tool, preferably of unitary formation or one-piece construction, that has maximum efficiency in operation, which is capable of facile attachment to the axle end independently of the wheel hub, whereby in pulling operations neither the threads of the hub nor those of the axle end will be marred, and a tool which is comparatively inexpensive to manufacture and market, as well as one that will require no future repairs.

The foregoing and other objects and advantages, however, will be so clearly apparent, as incidental to the following disclosure, that it would serve no useful purpose to further enlarge upon the same initially, and with these prefacing remarks, therefore, reference will now be immediately had to the accompanying drawings, illustrating certain practical embodiments of the improvements, in which drawings—

Figure 1 is a fragmentary view, showing a wheel hub in radial section as associated with its axle arm, and with the improved tool operatively associated with the threaded axle end; Figure 2 is an enlarged view of the tool by itself, its socketed end being shown in longitudinal section; Figure 3 is a face view of the socketed end of the tool; Figures 4 and 5 are fragmentary views analogous to that of Figure 2 but showing slightly modified formations of the bottom surface of the socket portion; and Figure 6 is a view merely illustrating the tool stock as being cylindrical and having a milled or knurled exterior surface.

Referring first to Figure 1, the numeral 15 designates a wheel hub which provides the usual external threads 16, for the attachment of the finishing hub cap, and the tapering bore 17 for the reception of the tapering axle arm 18, which terminates in the threaded axle end 19, for the attachment of the usual securing nut, it being also understood that provision is made for the longitudinal keying of the hub to the axle arm.

In our improved device, and referring particularly to Figs. 1, 2 and 3, we simply provide a hard metal elongated hand gripping stock 20 with an end-socket to fit over the axle end 19, but which end-socket is shallow enough so that the end of the tool is normally maintained substantially spaced from the hub of the wheel, as appears from Figure 1. The numeral 21 designates the face of the socketed end, and the socket itself is formed by a threaded bore 22 terminating or merging at its inner end in an annular recess or smooth bored chamber 23, the rear wall 24 of which may be flat-surfaced to uniformly contact the end surface of the axle end 19, and the functioning of this end chamber 23 is to enable the threading of the bore 22 clear up to the position where it merges into the annular recess 23, which latter may then receive the axle end projected therein snugly up against the rear wall surface 24, whereby any tendency to mutilate the threads of the axle end is entirely eliminated as well as any tendency to otherwise upset the axle end. Although shown a little exaggerated at Fig. 1, as a matter of fact and as shown at Figs. 2, 4 and 5 the diameter of the annular recess 23, or its peripheral wall surface 25, may substantially coincide with the larger diameter of the threads 22, but at any event this terminating smooth bored recess 23, whether or not it has the flat-surfaced back wall 24, is essential in order to receive the overhanging or extremity of the axle end which is projected therein when the tool is properly screwed home.

These axle ends, however, have a central recess, and, while at present Figs. 1 and 2 show what we might have considered our preferred form of tool, it might nevertheless be very desirable to make the rear wall surface of the socket with a conical projection 26, as shown at Fig. 4, or to make the rear wall partly flat surfaced as at 27 with a central teat 28, illustrated at Fig. 5, in which event the apex of the cone 26 would fit snugly in the recess of the axle end, or the teat 28 would be caused to be projected therein, with substantially the same results.

Naturally the elongated hand gripping stock of the tool could be peripherally formed of hexagonal shape as shown at Figs. 1 to 5, or of any other suitable contour, and in Figure 6 it is shown as cylindrical, as at 29, with a knurled or milled surface 30, both for ornamental finish and gripping purposes.

From all of the foregoing, and especially as viewed in connection with Figure 1, it will be seen that when the tool is properly applied to the axle end 19, it not only has no connection with the wheel hub or its threads 16, but also it will be observed that a rear portion of the socket snugly engages the axle end. It follows, therefore, that by tapping on the outer end of the tool stock the axle is driven away from the wheel hub, instead of the wheel hub being drawn off of the axle arm, and that, owing to the engagement of said rear portion of the socket of the tool with the axle end, there can be no stripping or other mutilation of the threads on the axle end.

It is believed that the great utility and full advantages of this simple improved tool will be clearly apparent, especially to the users of automobiles and the garage or repair man, but while we have thus fully set forth the improvements, it will nevertheless be understood that we do not confine ourselves necessarily to the details exactly as disclosed, excepting as they may come within the terms of the ensuing claims, or their equivalent, or as fairly interpreted in the light of the specification if necessary.

What we do claim, as new and patentable, is:—

1. A wheel removing tool, comprising a hard metal body provided with a socket, that is adapted to encompass the threaded end of an axle arm extending through the hub of its wheel, which socket is of a depth substantially less than the length of said axle arm's threaded end, being threaded for a portion of its length and terminating at its rear end in an annular chamber, that is peripherally unobstructed from said threaded portion to its rear wall, with means projected from the rear thereof to engage the end face of the threaded end of an axle arm when extended therein.

2. A wheel removing tool, comprising an elongated hard metal body provided with a longitudinally disposed socket at one end, that is adapted to encompass the threaded end of an axle arm extending through the hub of its wheel, which socket is of a depth substantially less than the length of said axle arm's threaded end, being threaded for a portion of its length and terminating at its rear end in an annular chamber, that is peripherally unobstructed from said threaded portion to its rear wall, with means projected from the rear thereof to engage the end face of the threaded end of an axle arm when extended therein.

In testimony whereof, we affix our signatures.

DANIEL S. LAMBERT.
CRANSTON B. RADER.